(12) United States Patent
Saarelma

(10) Patent No.: US 7,176,968 B1
(45) Date of Patent: Feb. 13, 2007

(54) CAMERA SYSTEM AND DISPLAY DEVICE

(75) Inventor: Hannu Saarelma, Espoo (FI)

(73) Assignee: Teknillinen korkeakoulu (FI)

( * ) Notice: Subject to any disclaimer, the term of this patent is extended or adjusted under 35 U.S.C. 154(b) by 0 days.

(21) Appl. No.: 10/018,283

(22) PCT Filed: May 10, 2000

(86) PCT No.: PCT/FI00/00420

§ 371 (c)(1),
(2), (4) Date: Mar. 18, 2002

(87) PCT Pub. No.: WO00/72089

PCT Pub. Date: Nov. 30, 2000

(30) Foreign Application Priority Data

May 11, 1999 (FI) .................................. 991086

(51) Int. Cl.
*H04N 3/14* (2006.01)
*H04N 5/335* (2006.01)
*H04N 9/04* (2006.01)
*H04N 9/083* (2006.01)

(52) U.S. Cl. .................... 348/275; 348/374; 250/208.6
(58) Field of Classification Search ................ 348/373, 348/374, 335, 340
See application file for complete search history.

(56) References Cited

U.S. PATENT DOCUMENTS

| | | | |
|---|---|---|---|
| 4,467,361 A * | 8/1984 | Ohno et al. ................. | 348/340 |
| 5,004,328 A * | 4/1991 | Suzuki et al. ............... | 359/664 |
| 5,485,004 A * | 1/1996 | Suzuki et al. ............. | 250/208.2 |
| 5,502,481 A | 3/1996 | Dentinger et al. | |
| 5,796,095 A * | 8/1998 | Matsuyama et al. ...... | 250/208.1 |
| 6,118,474 A * | 9/2000 | Nayar .......................... | 348/36 |
| 6,178,046 B1 * | 1/2001 | Broome et al. ............. | 359/618 |
| 6,670,985 B2 * | 12/2003 | Karube et al. ........... | 348/207.1 |

FOREIGN PATENT DOCUMENTS

| | | |
|---|---|---|
| DE | 26 29 233 A1 | 12/1977 |
| DE | 195 32 119 A1 | 3/1997 |
| DE | 196 49 281 A1 | 4/1997 |
| EP | 0 458 463 A1 | 11/1991 |
| FR | 2 741 960 A3 | 6/1997 |
| GB | 1439 152 A | 6/1976 |

\* cited by examiner

*Primary Examiner*—Vivek Srivastava
*Assistant Examiner*—Yogesh K. Aggarwal
(74) *Attorney, Agent, or Firm*—Rodman & Rodman

(57) ABSTRACT

The invention relates to a camera system and to a display device for displaying images recorded by the camera system. The camera system comprises a camera (1) provided with an optics system (2) and a photosensitive image surface (3) disposed near the optics symmetrically relative to its optic axis, the image refracted by the optics being projected onto said image surface. The photosensitive image surface is a concave spherical surface whose center of curvature is at the focal point of the optics.

14 Claims, 3 Drawing Sheets

CAMERA SYSTEM AND DISPLAY DEVICE

BACKGROUND OF THE INVENTION (1) Field of the Invention

The present invention relates to a camera system as defined in the preamble claim 1.

(2) Description of the Related Art

Photography was invented in the early part of the 19$^{th}$ century. Fairly soon, silver halides (AgBr, AgCl) were distinguished from the spectrum of light-sensitive materials as they were found to be light-sensitive when dispersed in gelatin. The dispersion was spread on a glass plate, which formed the photosensitive projection surface of the camera. The glass plate was a straight plate, and an optical system was developed which focused the image onto the plate even through apertures larger than a pinprick.

The glass plate was followed by the film, the film was followed by the vidicon, and the vidicon was followed by the digital matrix. However, the image plane still remains a plane both in cameras for still pictures and those for moving pictures. In azimuthal projection, the illumination on the projection surface is proportional to the square of the angle of deflection as measured from the optical axis:

$$I = (L \cos^4 \phi)/4f(1+m)^2$$

where
I is intensity at image plane,
L is luminance at target,
$\phi$ is the angle of a focus-originated radius to the optical axis,
f is the aperture number, and
m is the conversion factor.

Especially in the case of wide-angle optics, problems are encountered in respect of uniformity of illumination in the image area. Further, wide-angle images with an angular field of the lens exceeding 100° are difficult to accomplish without substantial distortion of straight lines.

In prior art, both of the above-mentioned errors have been corrected by way of digital image processing.

The object of the invention is to eliminate the drawbacks referred to above.

DETAILED DESCRIPTION OF THE INVENTION

A specific object of the invention is to disclose a camera system and a corresponding display device that will make it possible to produce a wide-angle image in which illumination is uniform over the entire image area and no lines in the image area are distorted.

As for the features characteristic of the camera and display device of the invention, reference is made to the claims.

The camera system of the invention comprises a camera provided with an optics system and a photosensitive image surface disposed in the vicinity of the optics system symmetrically relative to its optic axis, the image of the target refracted by the optics being projected onto said image surface.

According to the invention, the photosensitive image surface is a concave spherical surface whose center of curvature is at the focus of the optics. The camera of the invention projects the image onto the concave, focus-centered spherical surface, which functions as a light detector and may consist of light-sensitive detecting elements.

The camera system of the invention does not exhibit any anisotropy or geometric distortion, which are typical of conventional photographic techniques. The invention makes it possible to implement different focal distances up to a 180° observation angle.

The invention has the advantage that, when a normal focal distance is used, with a 60° angular field of the lens, the cosine error is avoided. Therefore, the isotropy of the image in respect of illumination is significantly better than in prior-art cameras. This is important in various image analysis applications in which the reflection density and color are used as a basis for making inferences about the target being analyzed.

When short focal distances (up to a 180° recording angle) are used, the invention has the advantage of eliminating the geometric distortions typical of current optical systems. When pictures are to be printed and/or displayed using traditional planar display surfaces, suitable rectangular undistorted areas can be cut off from the image by using appropriate software. When a display device according to the invention is used in which the display surface is a concave spherical surface, no geometric distortions appear.

When long focal distances are used, the visual effect that shortens the relative distances is eliminated.

In an optical sense, projecting the image onto a spherical surface is a less demanding task than conventional planar projection. Therefore, the cost of manufacturing an optical equipment free of aberrations for the system of the invention is lower than in the case of conventional optics.

In an embodiment of the camera system, the photosensitive image surface consists of a matrix of individual light-sensitive detecting elements, such as CCD elements.

In an embodiment of the camera system, the number of detecting elements is of the order of 100000 or more.

In an embodiment of the camera system, the number of detecting elements has been so chosen that, in order to achieve a reasonable image quality, the number is of the order of $10^4$–$3 \times 10^4$, to achieve a good image quality, of the order of $10^6$–$2 \times 10^6$, or to achieve a perfect image quality, of the order of $10^8$.

In an embodiment of the camera system, the detecting elements are so arranged on the image surface that their density is at a maximum on the principal axis and diminishes from the principal axis toward the edge zones.

In an embodiment of the camera system, the density distribution of the detecting elements on the image surface is consistent with the function:

$$I(r) = I_0 e^{-a\left(\frac{\sqrt{x^2+y^2+z^2}}{r_0}\right)^2},$$

where
$I_0$ density of detecting elements at the origin (on the principal axis),
$I(r)$ = local density of detecting elements at radius r from the origin, and
a = scaling factor.

In an embodiment of the camera system, the detecting elements in the high-resolution area near the optic axis are so arranged that the point spread function (PSF) produced by the optics integrates over several detecting elements to prevent aliasing.

In an embodiment of the camera system, the optics are of a type using a so-called normal focal distance and the image surface is a spherical calotte with a recording angle (α) of the order of 60°; and the camera comprises a shutter disposed between the optics and the image surface and provided with an adjustable aperture.

In an embodiment of the camera system, the recording angle of the image surface is 180° or less.

In an embodiment of the camera system, the optics comprise a lens with a short focal distance, such as a so-called fish-eye lens; the image surface is of a hemispherical shape and the recording angle is 180°, so that the camera is of a semispace recording type.

In an embodiment of the camera system, the camera is a digital camera which comprises means for digitization of the signals received from the detecting elements and means for transferring the digitized images to a computer. The image can be processed, transferred and printed in a digital form. The images can be displayed using a spherical surface display as mentioned above or conventional display devices. They can also be printed in an undistorted form on paper using image printers.

In an embodiment of the camera system, the camera is of a type designed to record moving pictures.

In an embodiment of the camera system, the camera is of a type designed to record still pictures.

In an embodiment of the camera system, the camera is a monitoring camera.

In an embodiment of the camera system, the system comprises two semispace recording cameras directed in opposite directions to the record the whole space.

In an embodiment of the camera system, the system comprises two adjacent semispace recording cameras directed in the same direction for the recording of a stereo image of the semispace.

According to the invention, the display surface of the display device used for the display of an image recorded using the above-mentioned camera system is a concave spherical surface.

The display device has the advantage that the illumination in the image is uniform over the entire image area and the image is geometrically undistorted, thus requiring no corrective processing regarding the luminance level or contours of the picture.

In an embodiment of the display device, the display device is a monitor, such as a computer monitor or a television, having a screen of the shape of a concave spherical calotte.

In an embodiment of the display device, the display surface is a wall or ceiling surface of a room, onto which the image can be projected so as to allow it to be viewed simultaneously by a plurality of persons.

In an embodiment of the display device, the display device is a personal display visor or the like, in which the display surface is a hemispherical display surface having its center at the focal point of the eye.

In an embodiment of the display device, the display visor or the like comprises two hemispherical display surfaces having their centers at the focal points of the eyes, one display surface for each eye for the viewing of stereo pictures.

In an embodiment of the display device, the display surface consists of a matrix of individual picture elements.

In an embodiment of the display device, the number of picture elements is of the order of 100,000 or more.

In an embodiment of the display device, the number of picture elements has been so chosen that, in order to achieve a reasonable image quality, the number is of the order of $10^4$–$3 \times 10^4$, to achieve a good image quality, of the order of $10^6$–$2 \times 10^6$, or to achieve a perfect image quality, of the order of $10^8$.

In an embodiment of the display device, the picture elements are so arranged on the display surface that their density is at maximum on the optic axis and diminishes from the optic axis toward the edge zones.

In an embodiment of the display device, the picture elements of the hemispherical display surface are larger in surface area in the edge zones than in the vicinity of the principal axis.

In an embodiment of the display device, the density distribution of the picture elements on the display surface is consistent with the function:

$$I(r) = I_0 e^{-a\left(\frac{\sqrt{x^2+y^2+z^2}}{r_0}\right)^2},$$

where $I_0$=picture element density at the origin (on the principal axis), $I(r)$=local picture element density at radius r from the origin, and a=scaling factor.

In an embodiment of the display device, the picture elements are implemented using fiber optics.

Cameras and display devices constructed according to the invention are very well suited for use in robotics applications with a visual capacity. As there are no line distortions, corresponding correction computation is avoided. As there are no structural illumination differences between the optic axis and the peripheral image areas, the interpreting computation produces more accurate results than when a traditional camera is used. Cameras and display devices constructed according to the invention are also very well applicable for use in simulators in which stimuli are created artificially for the entire visual field (e.g. flight simulator). Similarly, it is possible to produce entertainment and computer game material that gives a person a sensation of being virtually present in the situation photographed by the camera and reproduced by the spherical display. Using a pair of adjacent cameras, it is possible to generate a three-dimensional perception that fills the entire field of vision.

In the following, the invention will be described in detail by the aid of a few examples of its embodiments with reference to the drawings, wherein

BRIEF DESCRIPTION OF THE DRAWINGS

FIG. 1 shows a camera 1 which comprises optics 2 with a so-called normal focal distance, presented in the figure as a simple lens. The camera 1 further comprises a photosensitive image surface 3, which is a concave spherical surface, onto which the optics 2 project the image of the target. The center of curvature of the image surface 3 is at the focal point of the optics 2 on the optic axis L. With a lens 2 with a normal focal distance, a 60° recording angle is obtained, so the camera may have an image surface the shape of a spherical calotte. The camera further comprises a shutter 4 provided with an adjustable aperture and disposed near the lens 2, between the lens 2 and the image surface 3.

Figure 2:
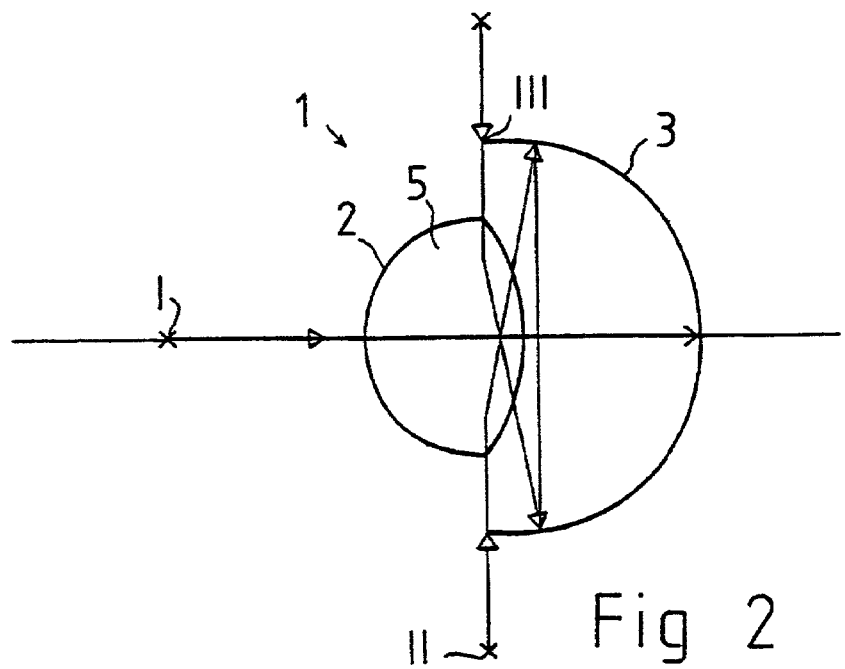
FIG. 2 presents a skeleton diagram of a second embodiment of the camera system of the invention.

The optics 2 in the camera 1 in FIG. 2 comprise a lens 5 with a short focal distance, a so-called fish-eye lens. The image surface 3 is of a hemispherical shape, so the camera is a semispace recording type of camera. The figure illustrates the projection of three targets I, I, III onto the hemispherical image surface. The recording angle is 180°. The picture of target I on the principal axis L is recorded on the image surface 3 on the principal axis L. Targets II and III, located on opposite sides at angles of 90°, are projected onto the edges of the hemispherical image surface.

Figure 1:
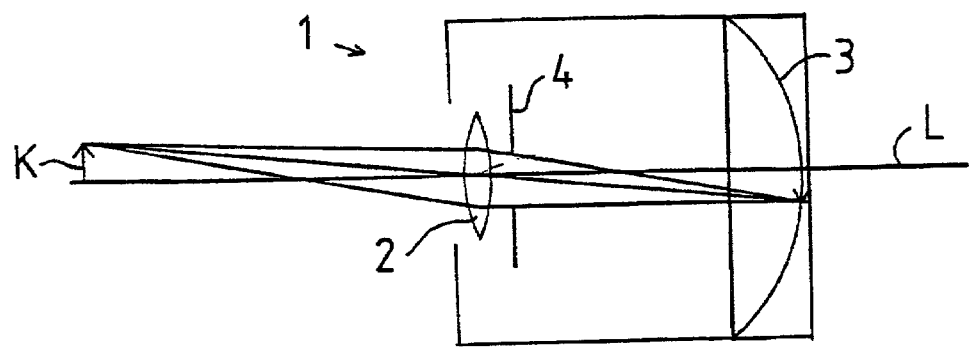
FIG. 1 presents a skeleton diagram of a first embodiment of the camera system of the invention.

The cameras in FIGS. 1 and 2 are preferably digital cameras capable of both still and moving image photography. The image surface 3 of the camera 1 is composed of individually placed digital detecting elements or it may be constructed using fiber optics. A reasonable image quality is achieved using about 100 000–300 000 detecting elements on the image surface 3. A good image quality is achieved using about 1–2 million detecting elements. If perfect image quality is desired, then the number of detecting elements should be of the order of $10^8$.

In cameras with a recording angle of 180° of the image surface 3 as illustrated in FIG. 2, which can see an entire semispace, with corresponding display devices, the position of the optic axis L corresponds to the point of sharp vision in the human eye while the edge zones correspond to the less sharp peripheral vision. Therefore, the density of detecting elements on the image surface 3 may vary so that the density is at a maximum in the region of the optic axis, i.e. the resolution is high, being reduced towards the edge zones, where the resolution is lower. For example, the Gaussian detecting element density distribution roughly corresponds to the frequency of utilization of the information when the image is being viewed. Other distributions are also possible. A varying detecting element density is suited for use e.g. in a remote control application in which a camera according to the invention installed on a robot photographs a real target while a person controlling the robot is watching the image produced by the camera, using a display device according to the invention. The distribution of the detecting element density on the image surface 3 may be e.g. as given by the following function:

$$I(r) = I_0 e^{-a\left(\frac{\sqrt{x^2+y^2+z^2}}{r_0}\right)^2},$$

where $I_0$=detecting element density at the origin (on the principal axis), $I(r)$=local detecting element density at radius r from the origin, and a=scaling factor.

Figure 3:
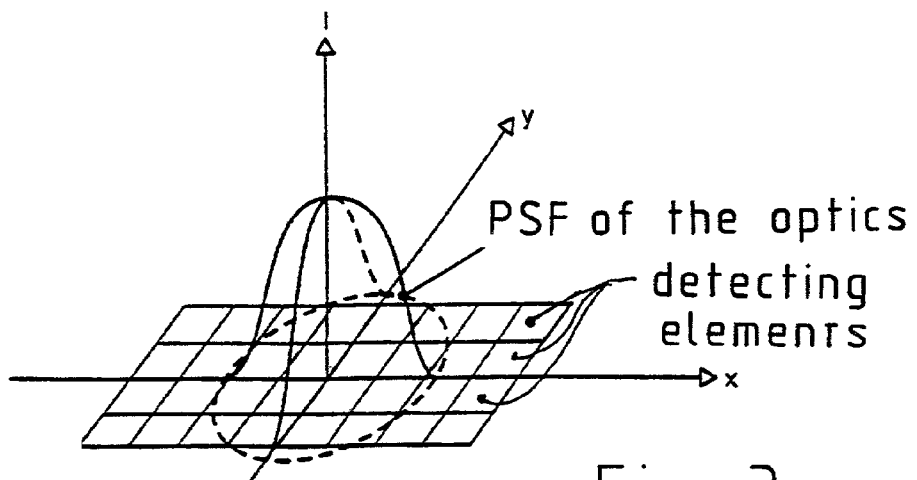
FIG. 3 presents a diagram illustrating the prevention of aliasing by means of the optics at points where the density of picture elements it at a maximum.

If the shooting frequency of the camera is higher than half the sensor frequency, this will result in a so-called aliasing effect, in consequence of which, when the frequency increases, MTF, having dropped to zero, receives high positive values at higher frequencies. Especially when structured objects are being photographed, this causes a substantial deterioration of image quality. Aliasing can be avoided in the high-resolution portions of a variable-resolution camera by using an arrangement as illustrated in FIG. 3. The point spread function PSF of the optics is so adapted that it will integrate over a few adjacent detecting elements.

Figure 4:
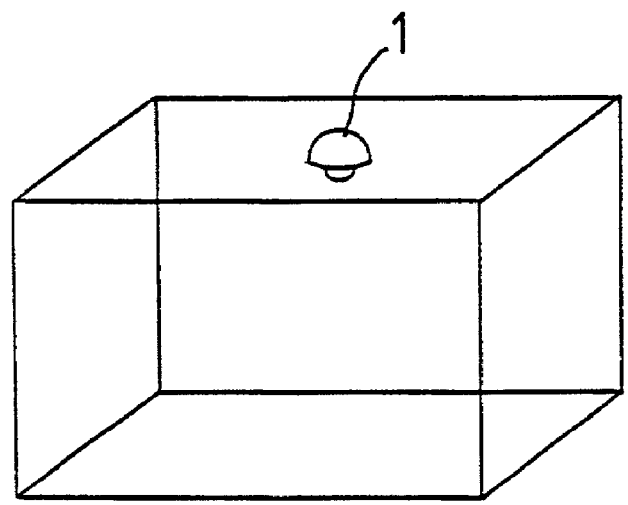
FIG. 4 presents a diagram illustrating a monitoring camera application of the camera system of the invention for the monitoring of a semispace in a room.
Figure 5:
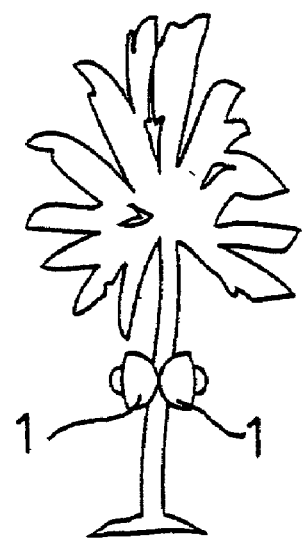
FIG. 5 presents a diagram illustrating a monitoring camera application of the camera system of the invention for the monitoring of the whole space in an open area.

FIGS. 4 and 5 illustrate the use of a semispace recording camera as presented in FIG. 2 as a wide-angle monitoring camera. Unlike previously known cameras which need to be moved to scan the surroundings, a camera like this can be fixedly and immovably mounted on the wall or ceiling of a room as shown in FIG. 4. When used e.g. as a monitoring camera in a bank, such an immovable camera is unnoticeable and difficult to detect. By using a pair of cameras looking in opposite directions as in FIG. 5, the whole open space around (2×semispace) can be monitored. Using a single camera, a geometrically undistorted picture of the semispace is produced by a single shot without moving the camera. Using two semispace recording cameras directed in the same direction, it is possible to produce stereo pictures to create a three-dimensional impression.

Pictures taken with the camera of the invention can be viewed as normal planar copies by using a planar display or making a planar print-out. It is also possible to construct special display devices 6 as presented in FIGS. 6–9 for the viewing of pictures taken with the camera 1. In a display device 6 like this, the display surface 7 on which the pictures are viewed is a concave spherical surface.

Figure 6:
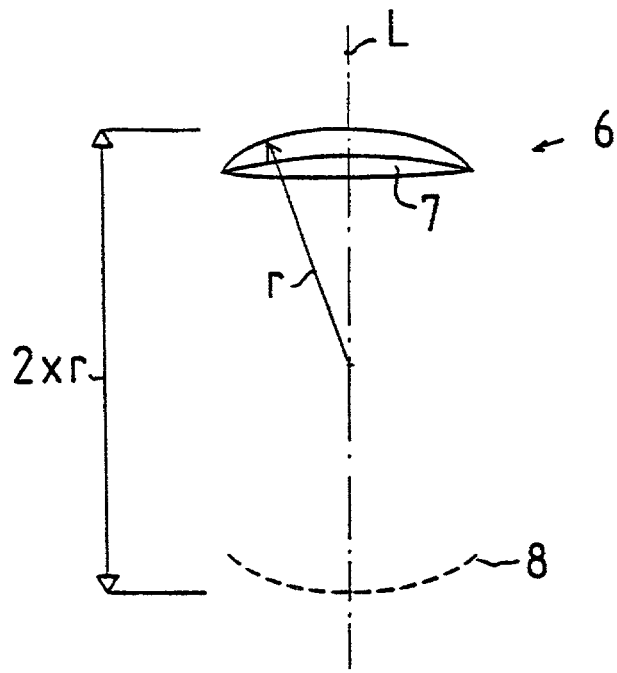
FIG. 6 presents a diagram of a first embodiment of the display device of the invention, i.e. a spherical calotte type monitor or television and an optimal viewing line for it.

FIG. 6 presents an embodiment in which the display device 6 is a monitor, such as a computer monitor or television, whose display screen is a display surface 7 having the shape of a concave spherical calotte. For this device, a preferable viewing distance is twice the radius r of the spherical calotte. The optimal viewing line is indicated by a broken line 8.

Figure 7:
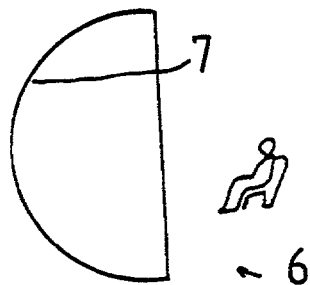
FIG. 7 presents a diagram of a second embodiment of the display device of the invention that allows the display of images to a plurality of viewers.

Referring to FIG. 7, in an application for a plurality of viewers, the display surface 7 may also consist of a hemispherical wall or ceiling surface in a room (omni-theater), onto which the image can be projected for simultaneous viewing by several persons.

Figures 8, 9:
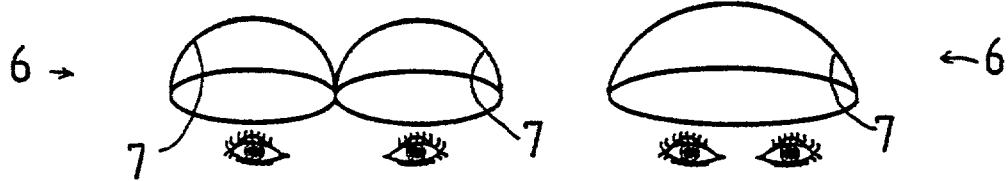
FIG. 8 presents a third embodiment of the display device of the invention, which is a personal display device for the display of stereo pictures.
FIG. 9 presents a diagram representing a fourth embodiment of the display device of the invention, which is a personal display device for the display of mono pictures.

FIGS. 8 and 9 present a display device 6 which is a personal display visor, display helmet or the like, in which the display surface 7 is a hemispherical display surface whose center is at the focal point of the eye. This device can be used e.g. for the presentation of virtual reality in entertainment and game applications and as a helmet display e.g. for air pilots.

In FIG. 8, the display visor or the like comprises two hemispherical display surfaces 7 having their centers at the focal points of the eyes, one display surface for each eye, for the viewing of stereo pictures, producing a three-dimensional impression.

In FIG. 9, the display visor is provided with a mono display with a single hemispherical display surface 7.

The display surface 7 in the display devices may consist of a matrix of individual picture elements. The number of picture elements has been so chosen that, to produce a reasonable image quality, the number is of the order of $10^4$–$3\times10^4$, to produce a good image quality, of the order of $10^6$–$2\times10^6$, or to produce a perfect image quality, of the order of $10^8$.

When the input device used is a variable-resolution camera, the display device can be constructed as a variable-resolution display. In a 180° display, the peripheral areas are implemented using fewer but larger picture elements, but so that they correspond to the high-resolution area in respect of image energy (=area of picture element×maximum luminance).

In a variable-resolution display device 6, the picture elements may be so arranged on the display surface 7 that their density is at a maximum on the principal axis L, diminishing from the principal axis toward the edge zones. The density distribution of the picture elements on the display surface is as expressed by the function:

$$I(r) = I_0 e^{-a\left(\frac{\sqrt{x^2+y^2+z^2}}{r_0}\right)^2},$$

where $I_0$=picture element density at the origin (on the principal axis), $I(r)$=local picture element density at radius r from the origin, and a=scaling factor.

The invention is not restricted to the examples of its embodiments described above; instead, many variations are possible within the scope of the inventive idea defined in the claims.

The invention claimed is:

1. Camera system comprising a camera (1) provided with an optics system (2) and a photosensitive image surface (3) disposed near the optics system symmetrically relative to its optic axis (L), the image of the object (K) refracted by the optics being projected onto the image surface, the photosensitive image surface (3) being a concave spherical surface whose center of curvature is at the focal point of the optics (2) and consisting of a matrix of individual photosensitive detecting elements, characterized in that the detecting elements are so arranged on the image surface (3) that their density is at a maximum on the optic axis (L) and diminishes from the optic axis toward the edge zones, characterized in that the density distribution of the detecting elements on the image surface (3) is consistent with the function:

$$I(r) = I_0 e^{-a\left(\frac{\sqrt{x^2+y^2+z^2}}{r_0}\right)^2},$$

where $I_0$=density of detecting elements at the origin (on the optic axis), $I(r)$=local density of detecting elements at radius r from the origin, and a=scaling factor.

2. Camera system as defined in claim 1, characterized in that photosensitive detecting elements are CCD elements.

3. Camera system as defined in claim 1, characterized in that the number of detecting elements is of the order of 100000 or higher.

4. Camera system as defined in claim 3, characterized in that the number of detecting elements has been so chosen that, to achieve a reasonable image quality, the number is of the order of $10^4$–$3\times10^4$, to achieve a good image quality, of the order of $10^6$–$2\times10^6$, or to achieve a perfect image quality, of the order of $10^8$.

5. Camera system as defined in claim 1, characterized in that the optics (2) has been so arranged that, in the high-resolution area near the optic axis (L), the point spread function (PSF) produced by the optics integrates over several detecting elements to prevent aliasing.

6. Camera system as defined in claim 1, characterized in that the optics (2) is of a type having a so-called normal focal distance and the image surface (3) is a spherical calotte with a recording angle of the order of 60°; and that the camera comprises a shutter (4) disposed between the optics and the image surface and provided with an adjustable aperture.

7. Camera system as defined in claim 1, characterized in that the recording angle of the image surface (3) is 180° or less.

8. Camera system as defined in claim 1, characterized in that the optics (2) comprises a lens (5) with a short focal distance, such as a so-called fish-eye lens; that the image surface (3) is of a hemispherical shape and the recording angle is 180°, the camera thus being of a semi-space recording type.

9. Camera system as defined in claim 1, characterized in that the camera (1) is a digital camera, which comprises means for digitization of the signals received from the detecting elements and means for transferring the digitized images to a computer.

10. Camera system as defined in claim 1, characterized in that the camera (1) is of a type for recording moving pictures.

11. Camera system as defined in claim 1, characterized in that the camera (1) is of a type for recording still pictures.

12. Camera system as defined in claim 1, characterized in that the camera (1) is a monitoring camera.

13. Camera system as defined in claim 1, characterized in that the system comprises two semi-space recording cameras (1) directed in opposite directions for the recording of the whole space.

14. Camera system as defined in claim 1, characterized in that the system comprises two adjacent semi-space recording cameras (1) directed in the same direction for the recording of a stereo image of the semi-space.

* * * * *